Patented Oct. 27, 1942

2,300,262

UNITED STATES PATENT OFFICE 2,300,262

PRESERVATION OF LATEX

John McGavack, Leonia, N. J., assignor to United States Rubber Company, New York, N. Y., a corporation of New Jersey No Drawing. Application September 10, 1940, Serial No. 356,185

4 Claims. (Cl. 260—820)

This invention relates to improvements in methods of preserving latex and the products thereof.

Latex is commonly preserved today with from 1 to 1.25% ammonia. The ammonia in such latex functions both as the basic material for rendering the latex alkaline to the proper degree, and also as a germicidal agent for preventing bacterial growth and the consequent development of acid in the latex which would result in coagulation. While ammonia is a satisfactory base for producing the desired alkalinity, its germicidal properties are so feeble that, if it is to act also as the germicidal agent, it must be used in concentrations greatly in excess of those necessary to otherwise merely obtain a satisfactory alkalinity.

The present invention relates to the preservation of latex with smaller amounts of ammonia than generally used in latex preservation procedures where ammonia is the sole preservative.

In carrying out the present invention latex is preserved against putrefaction and coagulation by the addition thereto of small amounts of a nitroparaffin or a halogen substituted nitroparaffin together with ammonia or other base. The nitroparaffin or halogen substituted nitroparaffin acts as a germicidal agent, and from .002 to .2 part of the nitroparaffin or halogen substituted nitroparaffin per 100 parts of latex (.002% to .2%) is the preferred range for preventing bacterial growth. Larger amounts of nitroparaffin or halogen substituted nitroparaffin, of course, may be added, but the proportions in excess of .2% are deemed unnecessary. While trichloronitromethane is the present preferred embodiment of the nitroparaffins and halogen substituted nitroparaffins for commercial reasons, other materials, as nitromethane, chloronitromethane, tribromonitromethane, nitroethane, 1-chloro-1-nitroethane, 1-nitropropane, 2-nitropropane, 1-chloro-1-nitropropane, 1-nitrobutane, 2-nitrobutane, may be used, preferably, as above described, in amounts from .002% to .2%. The addition of .2 to .75 part of ammonia per 100 parts of latex (.2% to .75%) has been found sufficient ammonia for proper preservation of latex in the presence of the nitroparaffins and halogen substituted nitroparaffins, the smaller amounts for centrifuged and creamed concentrates and larger amounts for normal latex, but in any case, less than the amount of base that will of itself preserve the latex may be used. Other bases than ammonia, for example, fixed alkalies, such as sodium and potassium hydroxides and water-soluble organic derivatives of ammonia, for example, basic amines, such as the mono- di- and tri-alkyl amines, preferably in amounts ranging from .2% to .5% may be used in conjunction with nitroparaffins and halogen substituted nitroparaffins, as above described, in amounts ranging from .002 to .2%. The combination of nitroparaffin or halogen substituted nitroparaffin and a base may be used to preserve fresh latex as it comes from the trees, or after concentration, as by centrifuging or creaming, for shipment to various countries. The combination may also be used to preserve latex that has already been exported from plantation countries with another type of preservative after freeing such latex from part or all of its original preservative. As the nitroparaffins or halogen substituted nitroparaffins will kill off aerobic, ammonia-resistant bacteria immediately, the nitroparaffin or halogen substituted nitroparaffin may be added to a latex insufficiently preserved with ammonia and already infected. Thus, where a latex containing an insufficient amount of ammonia, for example, arrives in this country from the plantations in an infected condition, the bacteria may be killed and the latex preserved for future use merely by the addition of a nitroparaffin or halogen substituted nitroparaffin. Also, where it is desired to reduce the ammonia content of an ammonia preserved latex so that it can be used in manufacturing processes with a low ammonia content, a small amount of nitroparaffin or halogen substituted nitroparaffin may be added to the latex on reduction of the ammonia content to prevent bacterial decomposition of the same. For example, a latex exported from plantation countries with the usual 1 to 1.25% ammonia, can be freed of any desired amount of this ammonia after its arrival at its destination, as by blowing air through it and then re-preserved with small amounts of nitroparaffin or halogen substituted nitroparaffin as above described. The nitroparaffins or halogen substituted nitroparaffins may be added to the latex directly or in suspension in water with or without the use of an emulsifying agent, such as soap. The alkali salts, for example, the sodium salts, of the nitroparaffin and halogen substituted nitroparaffins may be used as well as the free materials. The expression "nitroparaffins and halogen substituted nitroparaffins" in the description and claims is intended to include the alkali salts thereof as well as the free materials.

In order to illustrate the present invention various latices were inoculated with a known infectious latex, and survival data obtained of the aerobic bacteria introduced by inoculation with this infectious latex. The ammonia content of the latices tested was reduced to a sufficiently low value so that it was not resistant to the bacteria introduced by the infectious latex, and various nitroparaffins and halogen substituted nitroparaffins were added. The following examples give the survival data for various latices thus treated, the "control" being the latex with the reduced ammonia but without the addition of a nitroparaffin or halogen substituted nitroparaffin.

*Example I*

The ammonia content of a 38.8% ammonia preserved latex originally containing 1.0% ammonia, was reduced to .55% by blowing air therethrough. To samples of this were added various nitroparaffins and halogen substituted nitroparaffins. The samples were infected with 2.0% of a highly infectious latex at the time the ammonia was reduced and the nitroparaffins and halogen substituted nitroparaffins added, which time is hereafter called the "start," and were again inoculated after 8 days, after 38 days, and after 68 days. After 78 days bacteria counts were made on the control and the various samples preserved according to the present invention. The data obtained are as follows:

| Material added | Bacteria per cc. after 78 days |
|---|---|
| None (control) | 350,000 |
| .2% trichloronitromethane | 0 |
| .2% nitroethane | 0 |
| .2% nitromethane | 100 |
| .2% 1-nitropropane | 900 |
| .2% 1-chloro-1-nitropropane | 0 |

*Example II*

The ammonia content of a 63.8% total solids centrifuged latex originally containing .65% ammonia was reduced to .35% by blowing air therethrough. Various nitroparaffins and halogen substituted nitroparaffins were added, and the latex inoculated by the addition of 2.0% of a highly infectious latex at the start, after 5 days, and again after 28 days. The bacteria count after 49 days was as shown in the following table:

| Material added | Bacteria per cc. after 49 days |
|---|---|
| None (control) | 49,000 |
| .2% trichloronitromethane | 0 |
| .1% trichloronitromethane | 100 |
| .05% trichloronitromethane | 400 |
| .2% nitroethane | 100 |
| .2% nitromethane | 0 |
| .2% 1-chloro-1-nitropropane | 1,000 |
| .2% 1-chloro-1-nitroethane | 0 |
| .2% monochloronitrimethane | 0 |
| .2% tribromonitromethane | 0 |

*Example III*

The ammonia content of a 40.2% total solids content originally containing 1.0% ammonia was reduced to .52% by blowing air therethrough. Nitroparaffins and halogen substituted nitroparaffins were added to samples of the same and latex was inoculated with 2.0% of a highly infectious latex at the start and again after 12 days. The bacteria count after 15 days is shown in the following table:

| Material added | Bacteria per cc. after 15 days |
|---|---|
| None (control) | 600,000 |
| .1% nitromethane | 500 |
| .05% nitromethane | 200 |
| .1% nitroethane | 900 |
| .05% nitroethane | 400 |
| .1% 1-nitropropane | 5,600 |
| .05% 1-nitropropane | 6,400 |
| .1% 1-chloro-1-nitropropane | 100 |
| .05% 1-chloro-1-nitropropane | 0 |
| .1% 1-chloro-1-nitroethane | 400 |
| .05% 1-chloro-1-nitroethane | 74,000 |
| .1% tribromonitromethane | 0 |
| .05% tribromonitromethane | 4,900 |
| .1% monochloronitromethane | 0 |
| .05% monochloronitromethane | 4,700 |

*Example IV*

The ammonia content of a 1.0% solids latex originally containing 40.0% ammonia was reduced to .5% by blowing with air. The latex was then highly inoculated with bacteria by the addition of 2.0% of a highly infectious latex. Various amounts of different halogen substituted nitroparaffins were added directly to the latex and stirred to disperse the same therein, and also added as dispersions in aqueous ammonium oleate solutions. Bacteria counts were made after 24 hours and after 7 days, as shown in the following table:

| Preservative | Samples with preservative added dispersed in ammonium oleate solution: Bacteria per cc. after— | | Samples with preservative dispersed directly in the latex: Bacteria per cc. after— | |
|---|---|---|---|---|
| | 24 hrs. | 7 days | 24 hrs. | 7 days |
| None (control) | 36,000 | 32,000 | 36,000 | 32,000 |
| .01% trichloronitromethane | 0 | 0 | 0 | 0 |
| .005% trichloronitromethane | 0 | 0 | 0 | 0 |
| .002% trichloronitromethane | 200 | 400 | 300 | 600 |
| .02% 1-chloro-1-nitroethane | 2,200 | 700 | 1,300 | 200 |
| .01% 1-chloro-1-nitroethane | 5,900 | 1,100 | 6,000 | 1,400 |
| .02% 1-chloro-1-nitropropane | 1,600 | 400 | 2,200 | 1,000 |
| .01% 1-chloro-1-nitropropane | 6,800 | 1,300 | 6,400 | 1,300 |

*Example V*

The ammonia content of a 39.1% total solids latex originally containing 1.0% ammonia was reduced to .5% by blowing with air. To different samples of this latex were added a small amount of 1-nitropropane and of the sodium salt of 1-nitropropane. The samples were infected at the start by the addition of 2% of a highly infectious latex. The bacteria count after 7 days is shown in the following table:

| Material added | Bacteria per cc. after 7 days |
|---|---|
| None (control) | 150,000 |
| .1% 1-nitropropane | 4,100 |
| .125% sodium salt of 1-nitropropane | 3,300 |

*Example VI*

Latex as it came from the tree was treated with .5% ammonia and then divided into two parts. To one of these parts was added .1% trichloronitromethane. Both parts were inoculated with 2% of a highly infectious latex. At the end of 30 days the sample containing only the .5% ammonia had too many bacteria to count, while the sample containing the .1% trichloronitromethane in addition to the .5% ammonia contained no bacteria.

*Example VII*

Freshly tapped latex was treated with ammonia such that it contained .25% ammonia. This was then divided into two parts and to one part was added .1 part trichloronitromethane. The latex was not inoculated. At the end of one month the sample containing only the .25% ammonia had bacteria in numbers too great to count, while the sample containing the ammonia and trichloronitromethane contained no bacteria.

*Example VIII*

To latex as it came from the tree was added .1% potassium hydroxide. The latex was then inoculated with 2% of an infectious bacteria strain and divided into two parts. To one part was added .05% trichloronitromethane. At the end of a week bacteria counts were made and the portion containing only the potassium hydroxide had too many bacteria to count, while the portion containing the trichloronitromethane was bacteria free.

It is obvious that various modifications will suggest themselves to persons skilled in the art and it is not desired to limit the invention otherwise than as set forth in the appended claims.

Having thus described my invention, what I claim and desire to protect by Letters Patent is:

1. Latex containing .2% to .75% of a base selected from the group consisting of ammonia, water-soluble organic derivatives of ammonia, and fixed alkalies, said base being in amount less than that which of itself would preserve the latex, and said latex also containing .002% to .2% of a material selected from the group consisting of nitrated compounds and halogen substituted nitrated compounds of paraffinic hydrocarbons having no more than three carbon atoms.

2. Latex containing .2% to .75% of ammonia, said ammonia being in amount less than that which of itself would preserve the latex, and said latex containing .002% to .2% of a nitrated compound of a paraffinic hydrocarbon having no more than three carbon atoms.

3. Latex containing .2% to .75% of ammonia, said ammonia being in amount less than that which of itself would preserve the latex, and said latex containing .002% to .2% of a halogen substituted nitrated compound of a paraffinic hydrocarbon having no more than three carbon atoms.

4. Latex containing .2% to .75% of ammonia, said ammonia being in amount less than that which of itself would preserve the latex, and said latex containing .002% to .2% of trichloronitromethane.

JOHN McGAVACK.